(12) United States Patent
Buell

(10) Patent No.: US 11,299,229 B2
(45) Date of Patent: Apr. 12, 2022

(54) ELECTRIC SADDLE TYPE VEHICLE CHASSIS

(71) Applicant: FUELL Inc., New York, NY (US)

(72) Inventor: Erik Buell, Mukwonago, WI (US)

(73) Assignee: FUELL Inc., New York, NY (US)

(*) Notice: Subject to any disclaimer, the term of this patent is extended or adjusted under 35 U.S.C. 154(b) by 291 days.

(21) Appl. No.: 16/396,165

(22) Filed: Apr. 26, 2019

(65) Prior Publication Data

US 2019/0329836 A1 Oct. 31, 2019

Related U.S. Application Data

(60) Provisional application No. 62/823,813, filed on Mar. 26, 2019, provisional application No. 62/812,156, (Continued)

(51) Int. Cl.
*B62K 11/02* (2006.01)
*B62K 21/18* (2006.01)
(Continued)

(52) U.S. Cl.
CPC ............ *B62K 11/02* (2013.01); *B62J 43/16* (2020.02); *B62J 43/28* (2020.02); *B62K 11/10* (2013.01);
(Continued)

(58) Field of Classification Search
CPC ........ B62K 11/02; B62K 19/30; B62K 21/18; B62K 25/20; B62K 2204/00; B62J 43/00
(Continued)

(56) References Cited

U.S. PATENT DOCUMENTS 4,830,134 A 5/1989 Hashimoto
4,940,111 A 7/1990 Nogami et al.
(Continued)

FOREIGN PATENT DOCUMENTS

EP 1783039 A1 5/2007
EP 2130751 A1 12/2009
(Continued)

OTHER PUBLICATIONS

Jul. 11, 2019—(WO) ISR and WO—App. No. PCT/US19/29458.
(Continued)

*Primary Examiner* — Minnah L Seoh
*Assistant Examiner* — Maurice L Williams
(74) *Attorney, Agent, or Firm* — Banner & Witcoff, Ltd.

(57) ABSTRACT

A motorcycle, or saddle type vehicle, is disclosed that may have at least one seat and at least two wheels, at least one hub electric motor. A large dry storage compartment may be positioned between the rider and steering mount. A rechargeable battery and battery management system may be located below the storage compartment in a battery housing, where the battery housing may be a structural component of the chassis. A rear electronics housing may be attached to and located behind the battery housing, and may contain major electrical components such as electric motor controller and contactors. Two structural members, or frame side rails, may form sides of the storage compartment and extend between the electronics housing and steering mount. The electronics housing may also connect to the battery housing such that the battery housing reinforces and strengthens the chassis, or structural frame.

21 Claims, 13 Drawing Sheets

Related U.S. Application Data filed on Feb. 28, 2019, provisional application No. 62/812,166, filed on Feb. 28, 2019, provisional application No. 62/793,670, filed on Jan. 17, 2019, provisional application No. 62/776,036, filed on Dec. 6, 2018, provisional application No. 62/663,803, filed on Apr. 27, 2018.

(51) Int. Cl.
  *B62K 25/20*     (2006.01)
  *B62K 19/30*     (2006.01)
  *B62J 43/16*     (2020.01)
  *B62J 43/28*     (2020.01)
  *B62K 11/10*     (2006.01)

(52) U.S. Cl.
  CPC .............. *B62K 19/30* (2013.01); *B62K 21/18* (2013.01); *B62K 25/20* (2013.01); *B62K 2204/00* (2013.01)

(58) Field of Classification Search
  USPC ........................................................ 180/220
  See application file for complete search history.

(56) References Cited

U.S. PATENT DOCUMENTS

| | | | |
|---|---|---|---|
| 5,020,625 | A | 6/1991 | Yamauchi et al. |
| 5,127,560 | A | 7/1992 | Miyamoto et al. |
| 5,127,561 | A | 7/1992 | Miyamoto |
| 5,147,077 | A | 9/1992 | Nakajima et al. |
| 5,291,067 | A | 3/1994 | Nakajima et al. |
| 5,388,660 | A | 2/1995 | Shirasagi et al. |
| 6,687,592 | B2 | 2/2004 | Grob et al. |
| 7,446,222 | B2 | 11/2008 | Bit et al. |
| 7,931,110 | B2 | 4/2011 | Nishiura et al. |
| 8,002,067 | B2 | 8/2011 | Nishiura et al. |
| 8,265,814 | B2 | 9/2012 | Cominetti |
| 8,455,128 | B2 | 6/2013 | Belton |
| 8,485,299 | B2 | 7/2013 | Iida |
| 8,627,916 | B2 | 1/2014 | Shinde et al. |
| 8,662,229 | B2 | 3/2014 | Nakagome et al. |
| 8,672,077 | B2 | 3/2014 | Sand et al. |
| 8,789,640 | B2 | 7/2014 | Matsuda |
| 8,919,482 | B2 | 12/2014 | Matsuda |
| 8,957,618 | B2 | 2/2015 | Tadano et al. |
| 9,211,934 | B2 | 12/2015 | Eguchi |
| 9,394,024 | B2 * | 7/2016 | Maeda ........................ B62J 7/06 |
| 9,415,691 | B2 | 8/2016 | Murakami et al. |
| 9,434,441 | B1 * | 9/2016 | Sand ........................ B62K 19/32 |
| 2004/0036609 | A1 | 2/2004 | Kojika et al. |
| 2004/0118889 | A1 | 6/2004 | Hamilton |
| 2004/0214680 | A1 | 10/2004 | Schoon |
| 2008/0246315 | A1 | 10/2008 | Ito |
| 2011/0175467 | A1 | 7/2011 | Belton |
| 2011/0186400 | A1 | 8/2011 | Villeneuve |
| 2011/0233994 | A1 | 9/2011 | Harding et al. |
| 2012/0138375 | A1 | 6/2012 | Hughes |
| 2012/0234619 | A1 * | 9/2012 | Nakagome ............. B62K 11/04 180/219 |
| 2013/0162009 | A1 | 6/2013 | Mitts et al. |
| 2013/0282219 | A1 | 10/2013 | Matsuda |
| 2013/0292198 | A1 * | 11/2013 | Matsuda ................ B62K 11/04 180/220 |
| 2013/0299265 | A1 | 11/2013 | Marazzi |
| 2014/0027193 | A1 * | 1/2014 | Annaberger ............. B60K 1/04 180/220 |
| 2014/0297074 | A1 | 10/2014 | Lee et al. |
| 2014/0297079 | A1 | 10/2014 | Saitoh |
| 2014/0305729 | A1 | 10/2014 | Testoni et al. |
| 2015/0008061 | A1 | 1/2015 | Matsuda |
| 2015/0042160 | A1 * | 2/2015 | Matsuda ................ B60L 53/52 307/10.3 |
| 2015/0075889 | A1 | 3/2015 | Eguchi |
| 2015/0122563 | A1 * | 5/2015 | Kondo ................ H01M 10/655 180/68.5 |
| 2015/0232150 | A1 | 8/2015 | Kosuge et al. |
| 2015/0258898 | A1 | 9/2015 | Matsuda |
| 2015/0329011 | A1 | 11/2015 | Kawai |
| 2015/0329176 | A1 * | 11/2015 | Inoue ....................... B60K 1/04 180/220 |
| 2015/0375596 | A1 * | 12/2015 | Blain ..................... B60K 11/00 165/47 |
| 2016/0039489 | A1 | 2/2016 | Platz |
| 2016/0214677 | A1 * | 7/2016 | Mizuta ................... B62K 19/46 |
| 2016/0347281 | A1 | 12/2016 | Wu et al. |
| 2018/0050593 | A1 | 2/2018 | Gherardi et al. |
| 2018/0099675 | A1 | 4/2018 | Boisvert et al. |
| 2018/0215437 | A1 * | 8/2018 | Kurabayashi .......... B62K 11/04 |
| 2018/0215440 | A1 * | 8/2018 | Omosako ............... B62K 11/02 |
| 2019/0305276 | A1 * | 10/2019 | Suzuki ................ B60R 16/0215 |
| 2019/0329836 | A1 | 10/2019 | Buell |

FOREIGN PATENT DOCUMENTS

| | | |
|---|---|---|
| IT | TO20030942 A1 | 6/2004 |
| JP | 2017081486 A | 5/2017 |
| WO | 2011/101908 A1 | 8/2011 |

OTHER PUBLICATIONS

Apr. 6, 2020—(WO) ISR & WO—App. No. PCT/US2020/014158.
Honda-Pro Kevin, "2016 Honda NC700X DCT ABS Review / Specs / Pictures & Videos," visited May 3, 2018, at http://www.hondaprokevin.com/motorcycles-models/2016/honda-nc700x-dct-abs-review-specs-nc700xdg-adventure.
Bennetts, "Honda NC750X (2016): First Ride and Review!", visited May 3, 2018, at https://www.bennetts.co.uk/bikesocial/reviews/bikes/honda/honda-nc750x-2016.
Erik Buell et al., "EMN Short Newsflash | First New Designs from VanguardSpark with Erik Buell," visited Apr. 27, 2018 at <https://electricmotorcycles.news/emn-short-newsflash-first-new-designs-from-vanguardspark-with-erik-buell/>.
Photograh for "Helmet Storage".
Feb. 20, 2020—(WO) ISR & WO —App. No. PCT/US19/65038.
Aug. 12, 2020—(WO) ISR & WO—App. No. PCT/US20/20397.

* cited by examiner

ELECTRIC SADDLE TYPE VEHICLE CHASSIS

CROSS-REFERENCE TO RELATED APPLICATIONS

This application claims priority to U.S. Provisional Application No. 62/663,803 filed on Apr. 27, 2018, U.S. Provisional Application No. 62/776,036 filed on Dec. 6, 2018, U.S. Provisional Application No. 62/793,670 filed on Jan. 17, 2019, U.S. Provisional Application No. 62/812,156 filed on Feb. 28, 2019, U.S. Provisional Application No. 62/812,166 filed on Feb. 28, 2019, and U.S. Provisional Application No. 62/823,813 filed on Mar. 26, 2019. All of the above referenced applications are incorporated by reference in their entirety.

FIELD

This disclosure generally relates to an electric vehicle, more specifically, aspects relate to a saddle type vehicle.

BACKGROUND OF THE INVENTION

Although there have been many electric motorcycle, or a saddle type vehicle, products proposed and a number are in production, most of the products follow a conventional perspective of a motorcycle by replacing an internal combustion engine with an electric motor and attaching a battery much as a fuel tank would be added to a conventional motorcycle. These products also may integrate the electric motor as a part of the chassis much like an internal combustion motor is often used as a chassis component on a conventional motorcycle. As other options, the products may be designed for quick removal of battery packs to enable recharging indoors, while some may be designed to protect the batteries for use off road, where shorter travel distances make electric motorcycles a more viable option.

The unique clean operation of electric vehicles is highly desirable in urban areas, and use of two wheelers is seen in urban areas due to traffic flow and parking considerations. Indeed, the limited range of batteries and a recharging infrastructure in its infancy make urban areas the ideal location for electric two wheelers.

BRIEF SUMMARY

The disclosure may relate to a chassis design for a motorcycle and more specifically to a motorcycle frame structure, which includes the battery housing as a structural member, encloses a large dry storage area between upper frame rails and the battery housing. This design may locate the battery weight as low and forward as possible for optimum weight distribution, while also enclosing the batteries and electronics in a structural box, which adds substantial stiffness and strength to the frame assembly. With this type of structural battery housing attached to the bottom of the frame rails, these main frame rails can be narrow in cross-section and widely spaced apart, thus leaving a large storage space above the battery housing and in front of the rider. This frame utilizes two parallel beam-like structural members of that have a cross-sectional profile with a vertical height that is greater than a horizontal width on each side of the storage area that is located between upper chassis members between the front and rear wheel suspension. These side structural members may be attached in the front to a steering mount structure to which the steering apparatus and front suspension are attached, and at the rear to a vertical oriented electronics housing structure to which the seat support and the rear suspension are mounted. In addition, the battery housing structure may be attached at the bottom of the frame beam-like structural members, in front of the rear electronics housing structure and below of the front frame structure of the steering mount structure and structural members.

Other aspects of this disclosure may relate to a motorcycle chassis comprising a steering mount structure at a front side, where the steering mount structure is configured to attach to a front wheel, a first structural member connected to and extending from a rear end of the steering mount structure to a front end of an electronics housing, a second structural member connected to and extending from the rear end of the steering mount structure to the front end of the electronics housing, where the first structural member is on a first side of the chassis and the second structural member is on a second side of the chassis opposite the first side. The chassis may also have a battery housing connected to and positioned below the first and second structural members, where the battery housing is configured to contain at least one battery, where a storage compartment is formed above the battery housing and between the first structural member and the second structural member. The storage compartment may form an enclosed volume, where the storage compartment includes a bottom surface formed by a top surface of the battery housing, a first side surface formed by an inner surface of the first structural member, a second side surface formed by an inner surface of the second structural member, a rear surface formed by a forward surface of the electronics housing, and a top surface formed by a storage compartment cover. The enclosed volume of the storage compartment may be within a range of 30 liters and 60 liters. The battery housing may comprise a first side member and a second side member opposite the first side member, where the first side member and the second side member when connected together form a hollow interior. An exterior surface of the battery housing may be exposed. The electronics housing may contain electrical component, such as a charging port, where the charging port is accessed by opening a bodywork door, by opening the storage compartment cover, or by lifting a seat or a portion thereof. The storage compartment may be accessed by opening a storage compartment cover positioned in front of a seat. The battery housing may also contain a battery management system, a DC/DC converter, and a charging member. In some embodiments, the storage compartment may have a fitted liner inserted between the first structural member and the second structural member. The first structural member and the second structural member may be beams with a C-shaped cross-section. In other embodiments, the first structural member and the second structural member that may be formed from tubes welded together.

Still other aspects of this motorcycle chassis may further comprise a swingarm connected to the electronics housing, where the swingarm extends rearward of the electronics housing and is configured to support a rear wheel, and where the electronics housing is connected to a rear surface of the battery housing. The battery housing may include an environmental seal. The top surface of the battery housing may have a pair of extensions protruding vertically from the top surface, where a first extension of the pair of extensions engages and connects to the first structural member and a second extension of the pair of extensions engages and connects to the second structural member.

Additional aspects of this disclosure may relate to a saddle type vehicle chassis comprising a steering mount structure at a front side, where the steering mount structure is configured to attach to a front wheel, a first structural member connected to and extending from a rear end of the steering mount structure to a front end of an electronics housing, a second structural member connected to and extending from the rear end of the steering mount structure to the front end of the electronics housing, where the first structural member is on a first side of the chassis and the second structural member is on a second side of the chassis opposite the first side, a battery housing connected to and positioned below the first and second structural members, wherein the battery housing is configured to contain at least one battery, wherein the battery housing includes a front wall, a rear wall opposite the front wall, a top wall extending rearward from the front wall, a bottom wall extending rearward from the front wall opposite the top wall, a first side wall extending between the top wall and the bottom wall, and a second side wall extending between the top wall and the bottom wall opposite the first side wall; wherein the electronics housing is connected to the rear wall of the battery housing. The chassis may further comprise a swingarm connected to the electronics housing, where the swingarm extends rearward of the electronics housing and is configured to support a rear wheel; and a storage compartment formed above the battery housing and between the first structural member and the second structural member, where the storage compartment forms an enclosed volume, and wherein the storage compartment includes a bottom surface comprising a top surface of the battery housing, a first side surface formed by an inner surface of the first structural member, a second side surface formed by an inner surface of the second structural member, a rear surface formed by a forward surface of the electronics housing, and a top surface formed by a storage compartment cover. Each of the first structural member and the second structural member may have a substantially C-shaped cross-section. The top wall of the battery housing has a pair of extensions protruding vertically above the top wall, wherein a first extension of the pair of extensions engages and connects to the first structural member and a second extension of the pair of extensions engages and connects to the second structural member. The enclosed volume of the storage compartment is within a range of 30 liters and 60 liters. A seat support structure may be connected to the electronics housing.

This disclosure may have further aspects related to a structural frame for a saddle type vehicle comprising a steering mount structure at a front side of the frame, where the steering mount structure is configured to attach to a front wheel, a first structural member connected to and extending from a rear end of the steering mount structure to a front end of an electronics housing, a second structural member connected to and extending from the rear end of the steering mount structure to the front end of the electronics housing, where the first structural member is on a left side of the frame and the second structural member is on a right side of the frame. The structural frame may also include a battery housing connected to and positioned below the first and second structural members, where the battery housing is configured to contain at least one battery. The battery housing may include a front wall, a rear wall opposite the front wall, a top wall extending rearward from the front wall, a bottom wall extending rearward from the front wall opposite the top wall, a left side wall extending between the top wall and the bottom wall, and a right side wall extending between the top wall and the bottom wall opposite the left side wall; where the electronics housing is connected to the rear wall of the battery housing and where the front wall, the left side wall, and the right side wall have exposed portions. The structural frame may include a swingarm connected to the electronics housing, wherein the swingarm extends rearward of the electronics housing and is configured to support a rear wheel.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
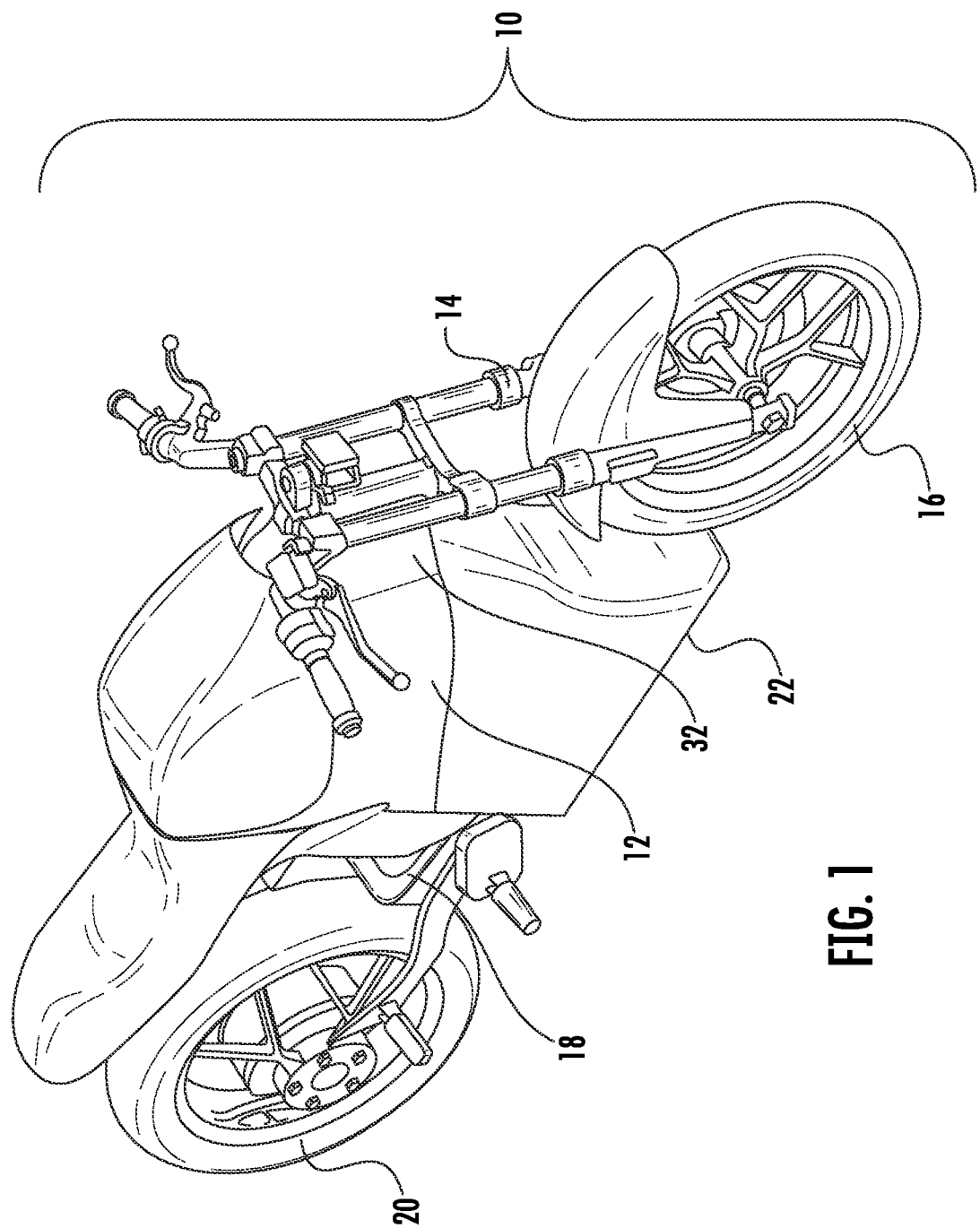
FIG. 1 illustrates a top front perspective view of an electric saddle type vehicle chassis according to aspects disclosed herein.

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "attached," "fixed," "connected," "coupled," "positioned," "engaged" and similar terms, is meant to include both direct and indirect mounting, attaching, fixing, connecting, coupling, positioning and engaging.

Also, while the terms "top," "bottom," "front," "back," "left," "right," "side," "rear," "upward," "downward," and the like may be used in this specification to describe various example features and elements of the disclosure, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three-dimensional orientation of structures in order to fall within the scope of this disclosure. Also, the reader is advised that the attached drawings are not necessarily drawn to scale.

In general, this disclosure relates to an electric motorcycle, or saddle type vehicle, chassis that provides a large volume easy access dry storage for daily commuter/shopper use, while also providing as large battery capacity combined with an easy access port for quick recharging of the batteries.

As shown in the embodiment of FIGS. 1-4, the motorcycle chassis 12 may include a front steering mount structure 32 connected to a first structural member 24 on a first side of the chassis 12 and a second structural member 26 on a second side opposite the first structural member 24 opposite the first side of the chassis 12. The first and second structural members 24, 26 may be spaced apart from each other and may have portions that are substantially parallel to each other. In some embodiments the structural members 24, 26 may have a curved shape such that they converge toward each other near the front structure 32. The structural members 24, 26 may have a narrow width and tall height, such that the height may be greater than the width and comprise the left and right sides of the chassis 12 of the motorcycle 10. For instance, the structural members 24, 26 may have a cross-sectional profile where a ratio of the height to the width may be of approximately 6:1, or within a range of 4:1 and 8:1, or within a range of 3:1 and 10:1. A battery housing 22 may be connected to the structural members 24, 26 and may be positioned below structural members 24, 26. The battery housing 22 may be configured to contain a rechargeable electric energy storage system ("RESS"), which may include an electrical energy storage device, such as a battery or battery capacitor, and battery management system. The battery housing may also include a DC/DC converter and a charging member. The motorcycle 10 may include at least one hub electric motor that is connected to the battery or RESS. A storage compartment 100 may be formed above the battery housing 22 and between the first and second structural members 24, 26. The battery housing 22 may include hollow interior and may be attached to a bottom surface of said side members, (first and second structural members 24, 26) in multiple locations. The battery housing 22 and side members 24, 26 may be attached to a rear structural electronics housing 34, which may have a swingarm 18, the rear suspension 19, and a rider seat support structure 17. In some embodiments, the battery housing 22 may be mounted to the front structure 32.

FIG. 1 illustrates a motorcycle 10 having the chassis 12. The chassis 12 may define the frame structure comprising the front structure 32 and the thin walled dual beam upper center structure 24, 26. The front structure 32 may connect to the front telescoping fork 14, or front suspension, that may bear front wheel 16 at the front end of the motorcycle 10. In addition, the frame structure may include the rear structure 34. The swingarm 18 may mount to the rear structure 34, where the swingarm 18 may bear rear wheel 20. Battery housing 22 may be attached in multiple locations beneath the structural members 24, 26 and/or between the substantially parallel beam members 24, 26 of dual beam frame structure. The battery housing 22 may also be attached in multiple locations to rear structure 34. The battery housing 22 may act as a structural reinforcement to help stiffen the chassis 12. Because the batteries, or RESS, may comprise a large percentage of the weight of the motorcycle 10, positioning battery housing 22, and the enclosed batteries, beneath the structural members 24, 26 helps to position the overall center of gravity of the motorcycle 10 in a low and forward position, which may improve handling and control of the motorcycle 10.

Figure 2:
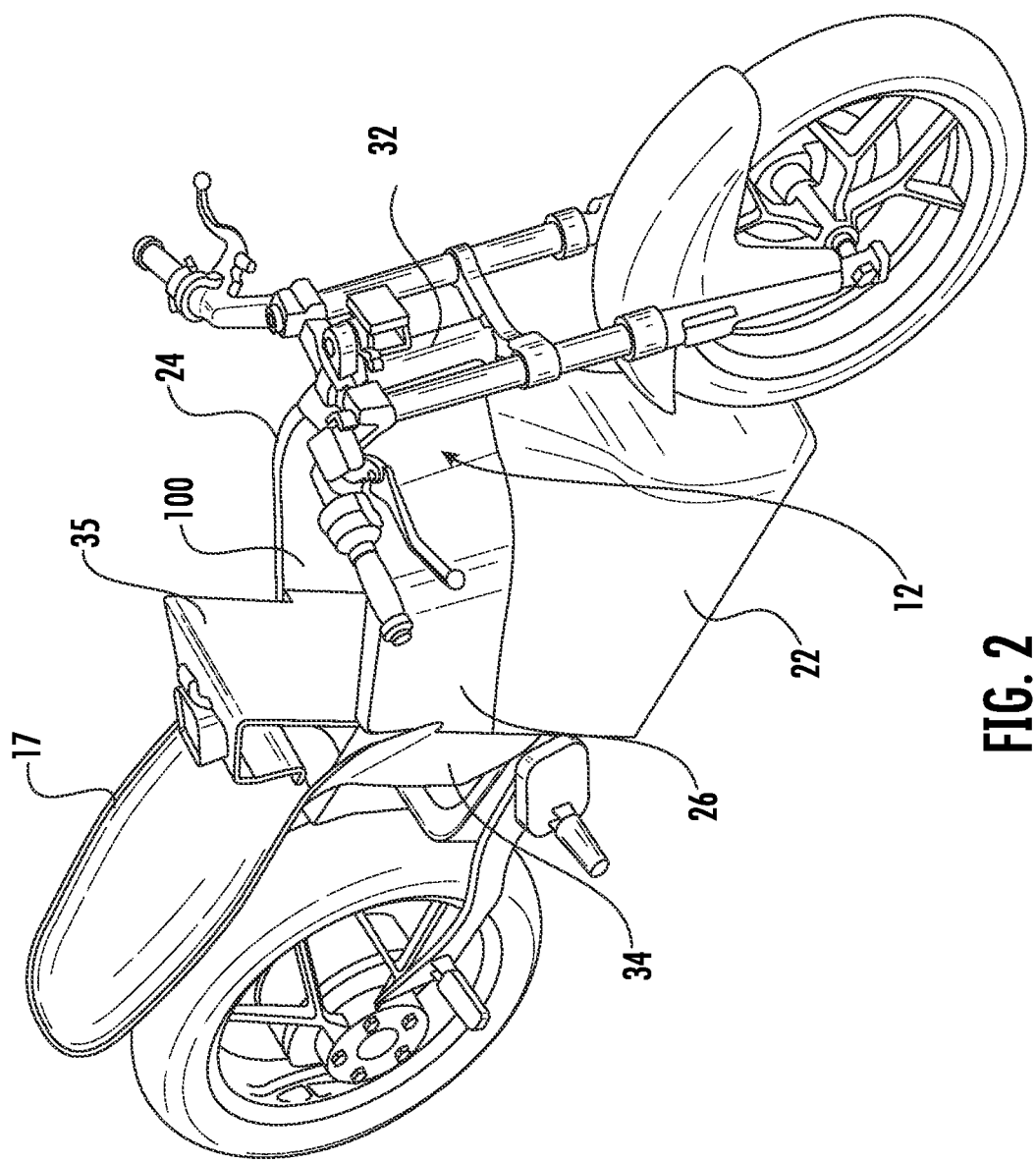
FIG. 2 illustrates a top front perspective view of the electric a saddle type vehicle chassis of FIG. 1 with the seat and cover removed for clarity according to aspects disclosed herein.
Figure 3:
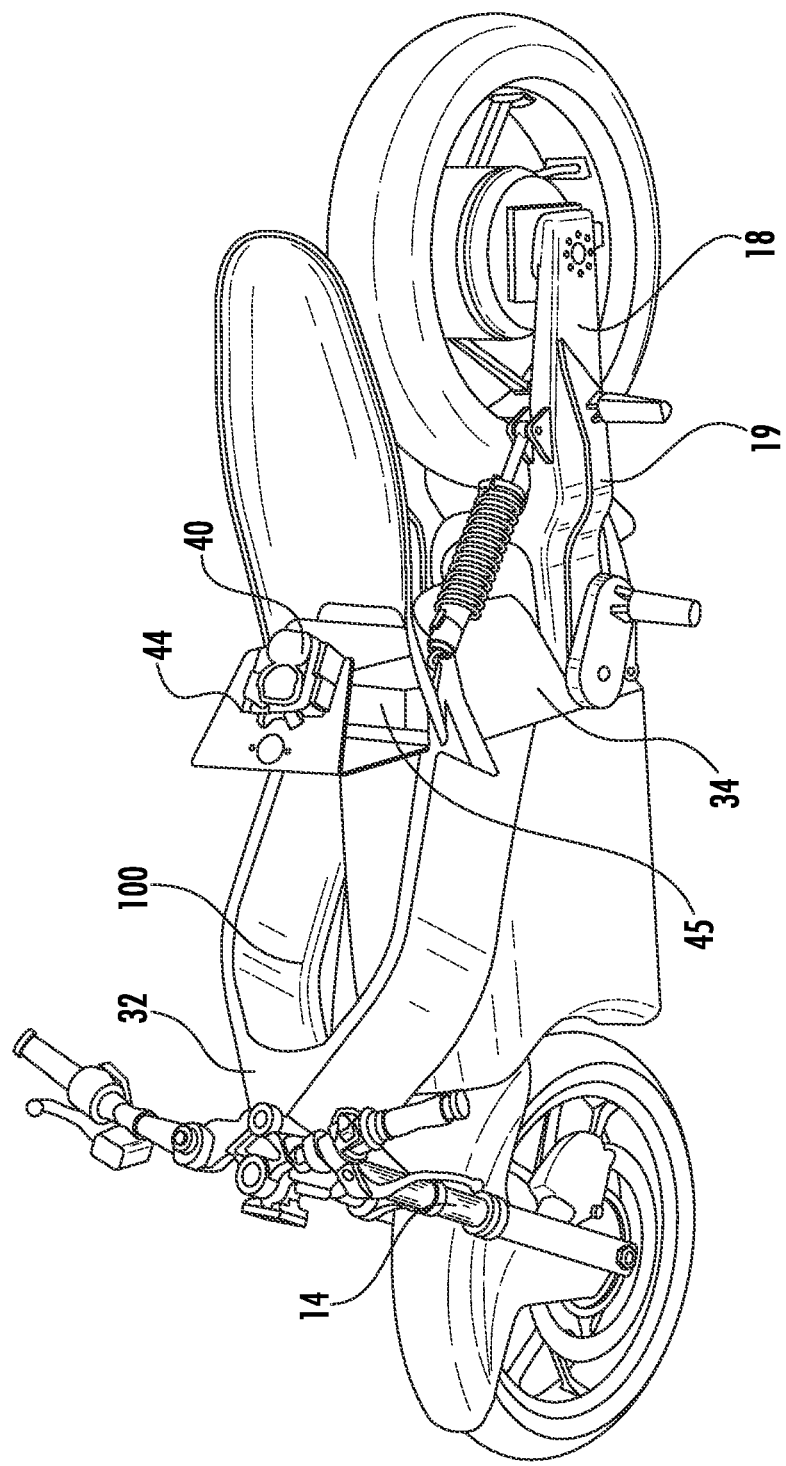
FIG. 3 illustrates a top side perspective view of the electric saddle type vehicle chassis of FIG. 1 with the seat and cover removed for clarity according to aspects disclosed herein.
Figure 4:
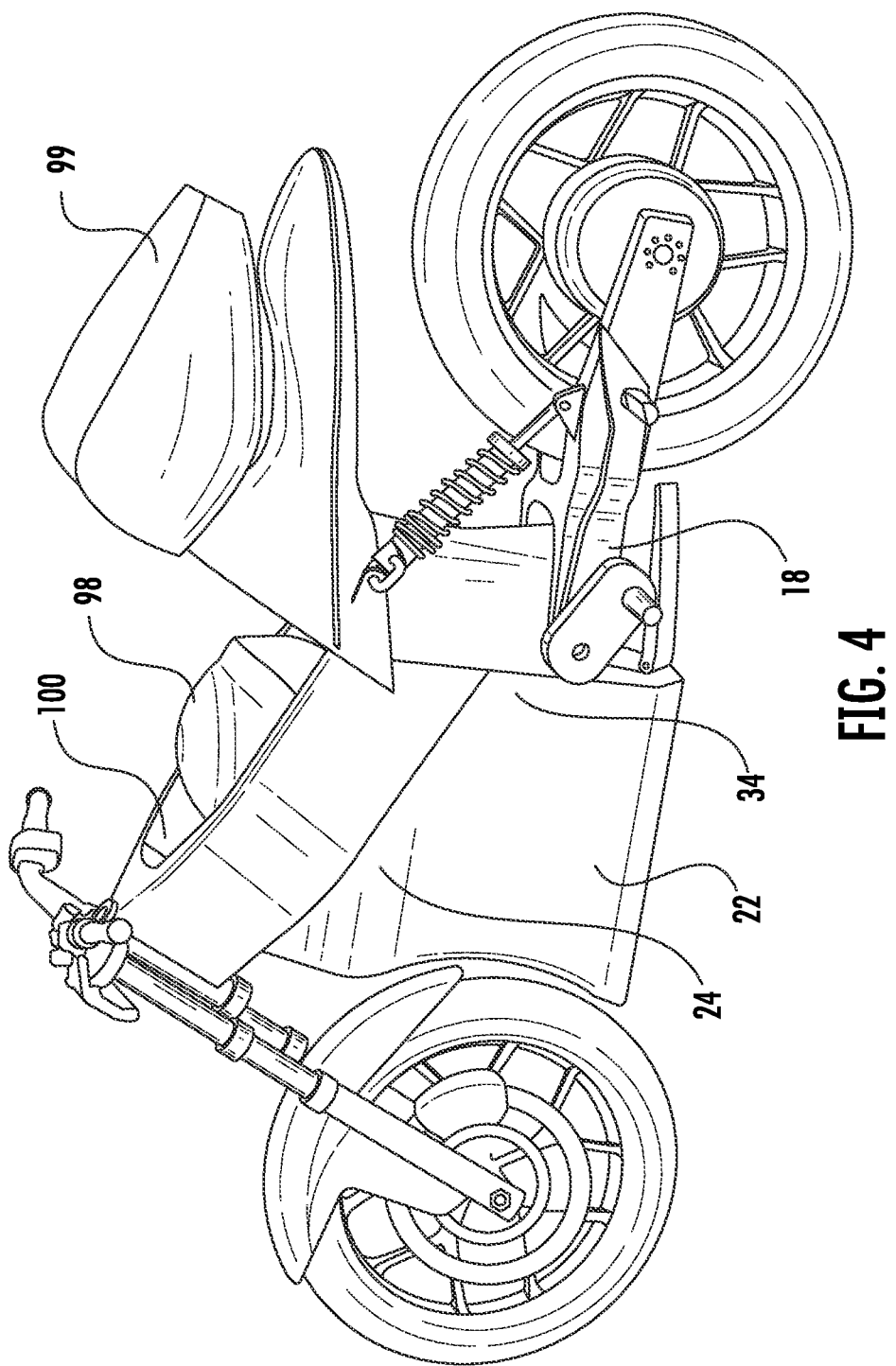
FIG. 4 illustrates a side perspective view of the electric saddle type vehicle chassis of FIG. 1 with the cover opened according to aspects disclosed herein.

As seen in FIGS. 2 and 3, a storage compartment 100 may be formed above battery housing 22 between structural members 24, 26. The storage compartment 100 may have a bottom surface formed by a top surface of battery housing 22, a left side surface formed by an inner surface of first beam member 24 and a right side surface formed by an inner surface of beam member 26, a rear surface may be formed by a forward surface of the electronics housing 34, and a top surface formed by an inner surface of cover 99. The battery housing 22 may add torsional and bending stiffness to the chassis 12, which may eliminate the need for any additional structure between frame rails 24, 26. This structure also may allow for a dry storage compartment 100 that can form an enclosed volume capable of holding large objects such as helmet 98 shown in FIG. 4. The volume of the storage compartment 100 may be approximately 50 liters, or may be within a range of 30 liters and 60 liters. Further, the storage compartment may have a vertical interior height at least 12 inches. The storage compartment cover 99 may be rotatably attached or hinged in front of the seat such that when opened provides access to the storage compartment 100.

Figure 5:
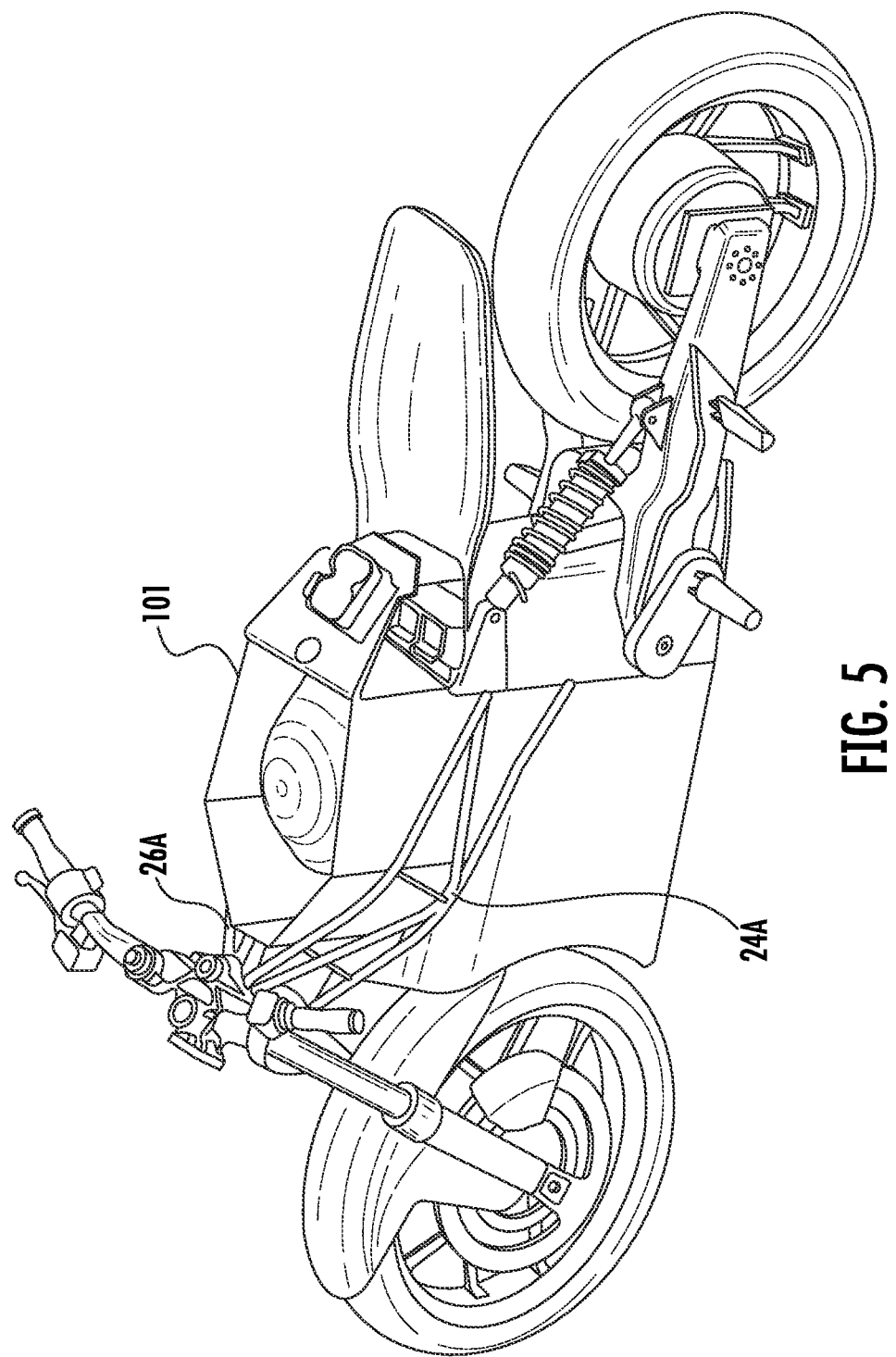
FIG. 5 illustrates a top side perspective view of an alternate embodiment of the electric saddle type vehicle chassis of FIG. 1 with the seat and cover removed for clarity according to aspects disclosed herein.

Each of beam members 24 and 26 may be attached at their front end to front structure 32 which supports the front suspension 14. The front structure 32 may be substantially V-shaped and include a receiver, or forward opening, for the front suspension 14 and a rear end with a pair of engaging members. Each of the structural members 24, 26 may be beams that have a substantially C-shaped cross-sectional shape, or alternatively, as shown in FIG. 5, the structural members 24, 26 may be formed from welded tubular side beam members 24A and 26A. In some embodiments, the storage compartment 100 may include an inner liner 101 to better define the enclosed dry storage volume 100.

The rear structure 34 may be in the form of a box-like casting, where the swingarm 18 and seat support structure 17 attach to the rear of the rear structure 34. As seen in FIG. 3 rear shock absorber 19 may be attached at one end to swingarm 18 and on the other end to rear structure 34. The rear structure 34 may be provided with a front cover plate 35. The electric motor controller 45 and other electronic components may be mounted to the front cover plate 35. Other electrical components maybe contained in the interior of rear structure 34, such as a high voltage relay.

The rear of battery housing 22 may be attached at the front of electronic housing 34, the top wall of battery housing 22 may be attached to the bottom of beams 24 and 26, and in some embodiments, the top front portion of the battery housing 22 may be connected to the front structure 32. Rear structure cap 44 may be mounted on top of rear structure 34 and include a quick charge port 40 which connects to the high voltage ground and to an electrical contact or similar component inside the electronics housing 34.

Figure 6:
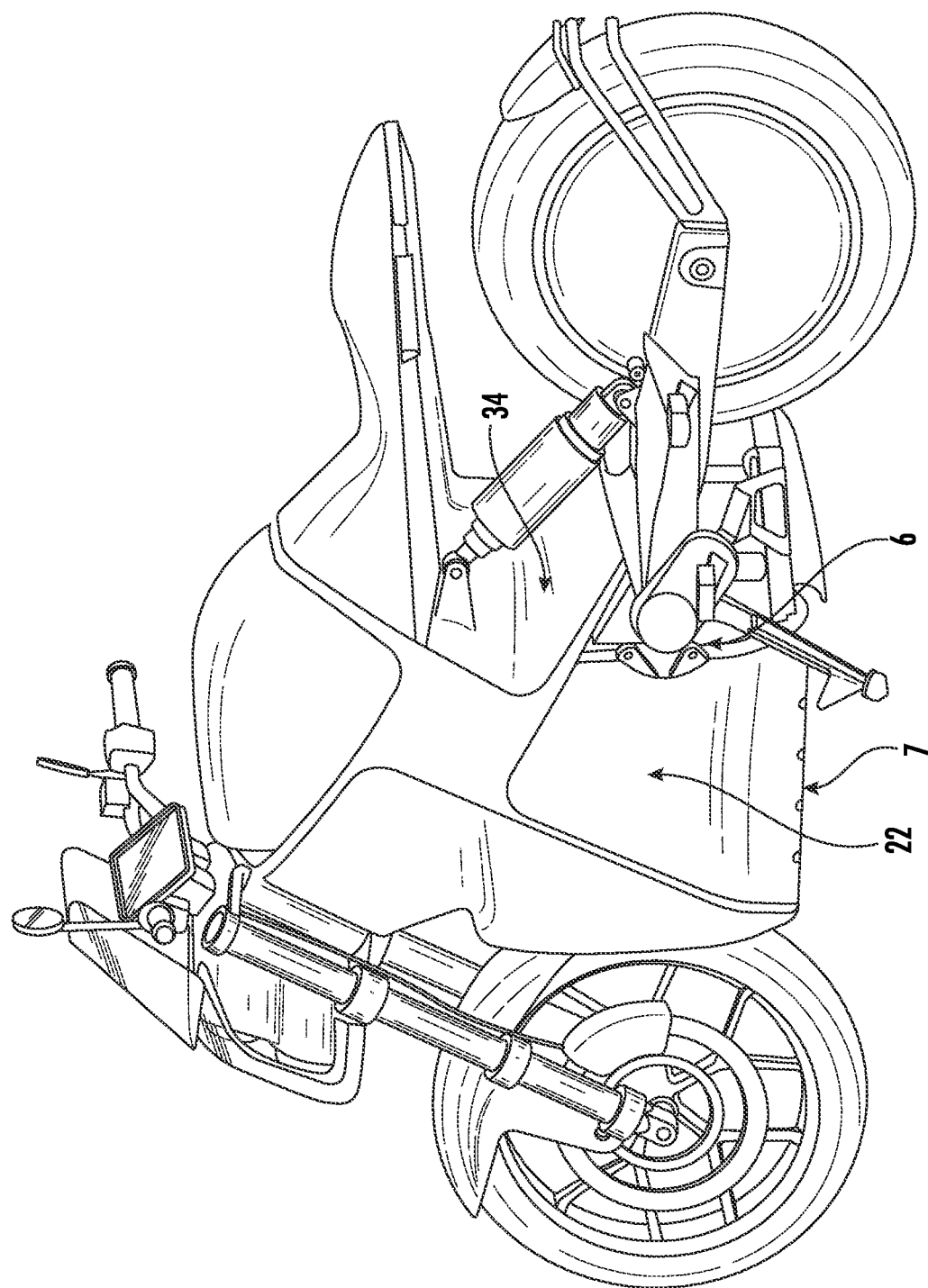
FIG. 6 illustrates a side perspective view of an alternate embodiment of the electric saddle type vehicle chassis of FIG. 1 according to aspects disclosed herein.
Figure 7:
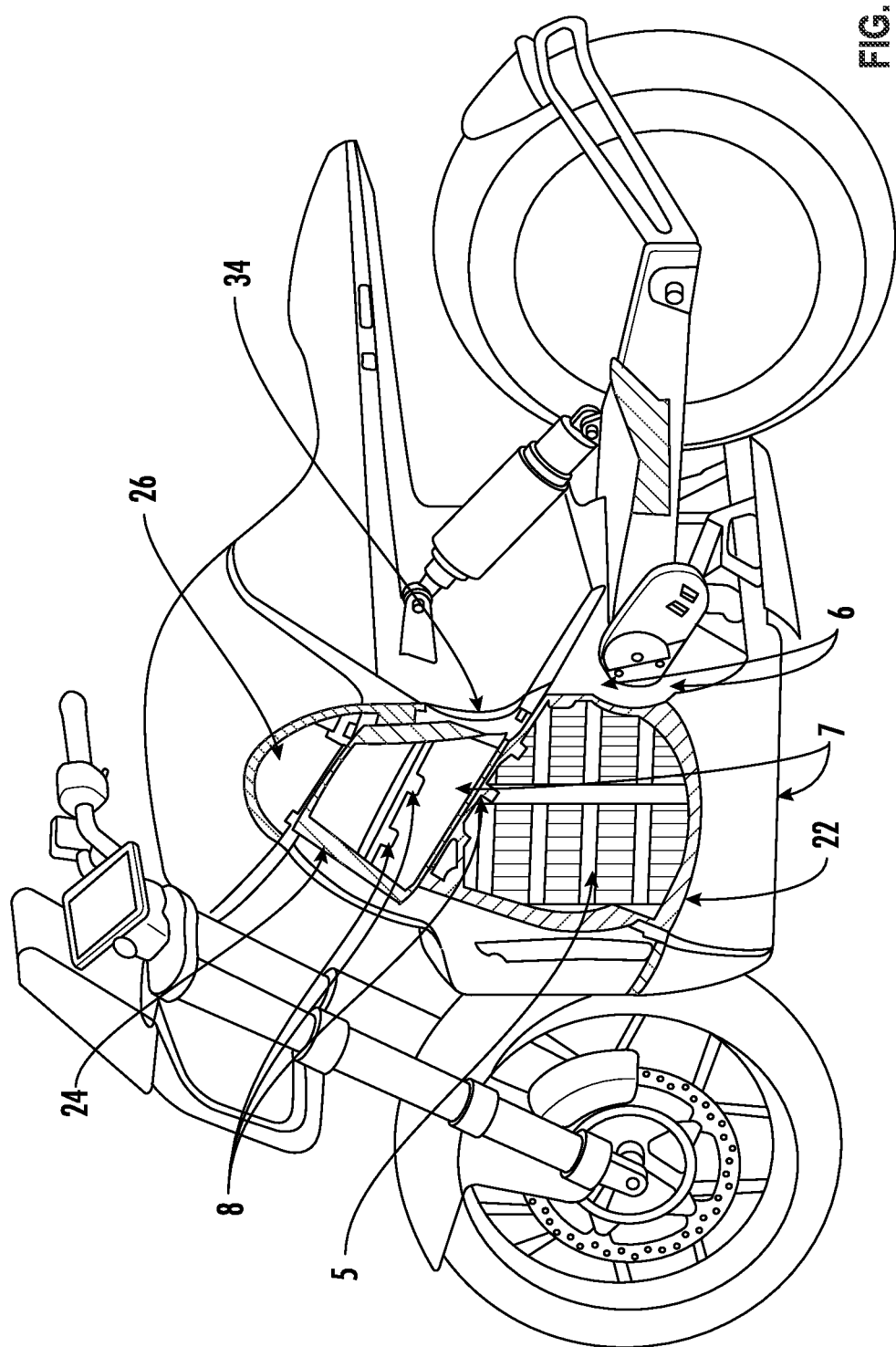
FIG. 7 illustrates a partial cross-sectional view of the electric saddle type vehicle chassis of FIG. 6 according to aspects disclosed herein.
Figure 8:
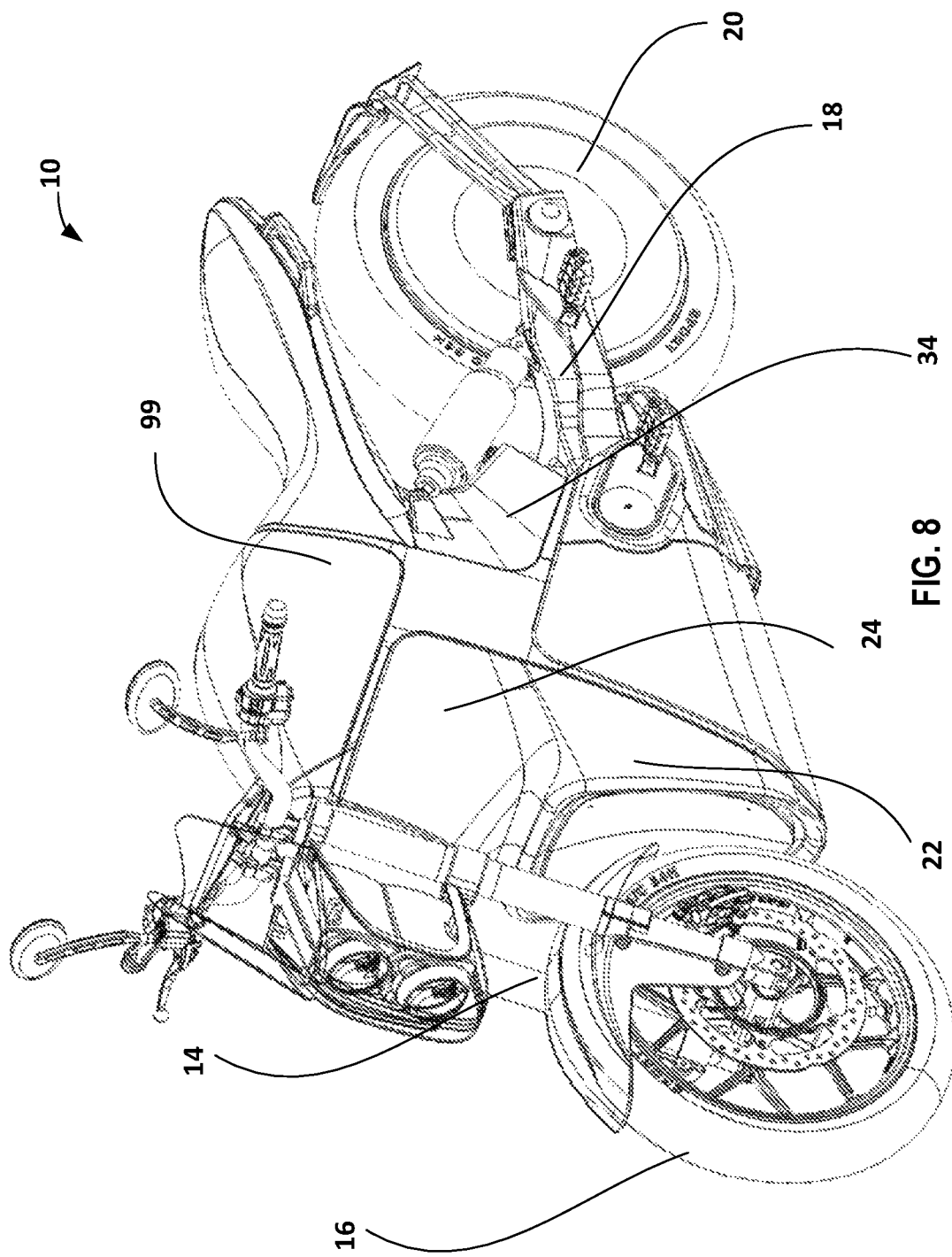
FIG. 8 illustrates a front perspective view of the electric saddle type vehicle chassis of FIG. 6 according to aspects disclosed herein.
Figure 9:
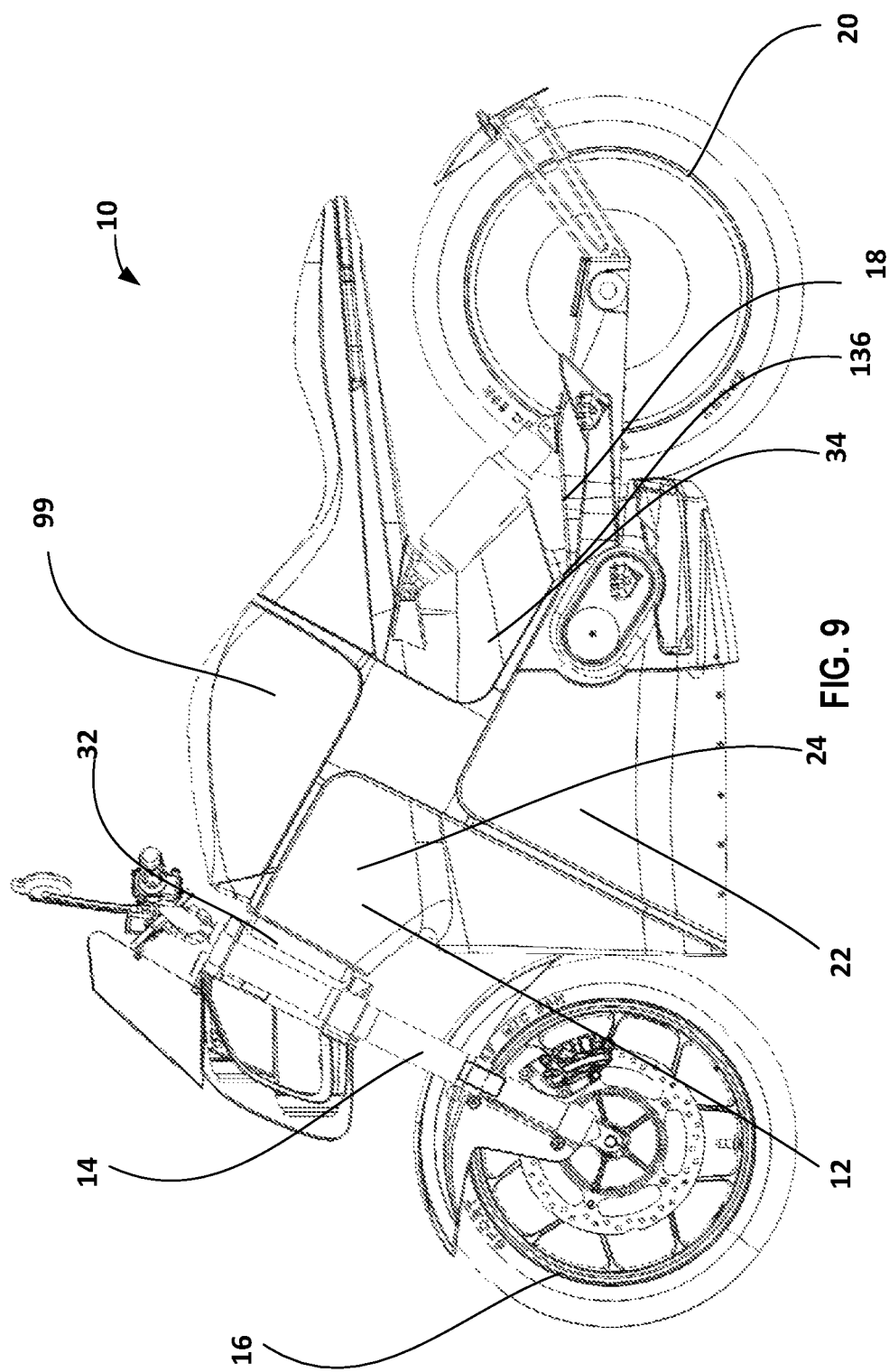
FIG. 9 illustrates a side view of the electric saddle type vehicle chassis of FIG. 6 according to aspects disclosed herein.
Figure 10:
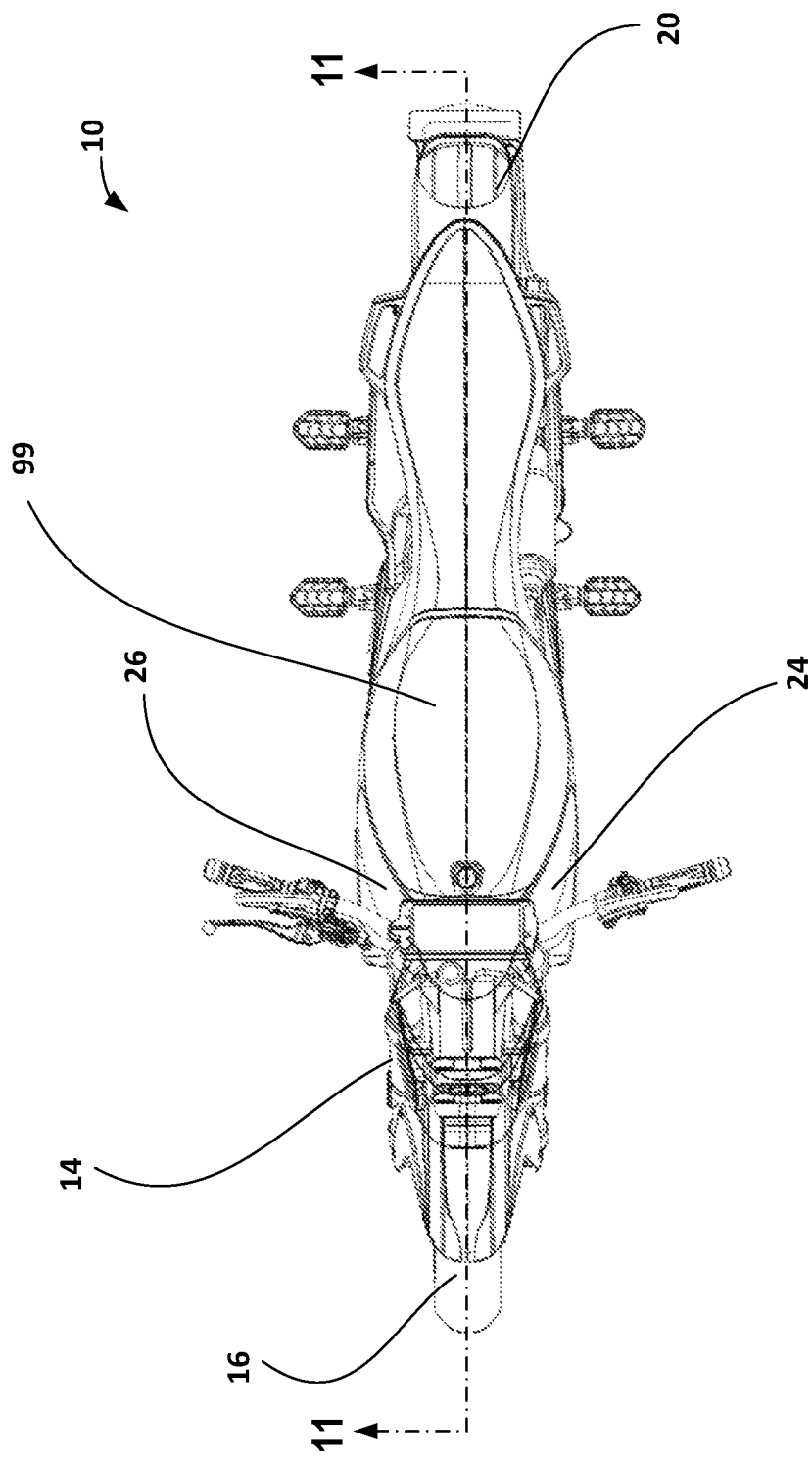
FIG. 10 illustrates a top view of the electric saddle type vehicle chassis of FIG. 6 according to aspects disclosed herein.

FIGS. 6-11 illustrate an embodiment of the motorcycle with chassis 12 described above. The structural members 24, 26, the battery housing 22, and the electronics housing 34 may be attached to each other with a plurality of mechanical connections. For example, the mechanical connections may be a plurality of mechanical fasteners, such as screws, or similar fasteners known to one skilled in the art. The fasteners may have a drive mechanism to ensure they are tamper proof to prevent any removal by an end user. FIG. 6 shows an external view of a motorcycle embodiment showing some of the attachment locations 6 where battery housing 22 is fixed to rear structure 34. In addition, as will be discussed in more detail below, a portion of the attachment locations 7 for the mechanical connections between the first side member 110 and the second side member 112 of the battery housing 22 may be along a longitudinal centerline of the motorcycle 10. FIG. 7 shows a partial cutaway view of the vehicle shown in FIG. 6. Battery cell pack 5 is visible as enclosed in battery housing 22. Internal attachment locations 7 between side members 110, 112 of battery housing 22 are seen, as well as a portion of attachment locations 8 of the mechanical connections that attach the battery housing 22 to the structural members 24, 26 to the top of battery housing 22.

The structural frame 12 may provide the required stiffness and strength to carry the structural loads efficiently from the steering mount structure 32 through the structural members 24, 26 and then through both battery housing 22 and electronics housing 34. In other words, the load path from tire to road forces may travel and be carried from the steering mount structure 32 through the structural members 24, 26 and then through both battery housing 22 and electronics housing 34, and the chassis structure may prevent deflection of the wheels relative to the center of gravity under lateral, longitudinal and vertical loads. For example, the structural frame 12 may have adequate stiffness and strength to prevent the frame from twisting under normal loading conditions such that the front wheel and rear wheel remain substantially coplanar when the vehicle receives up to a three g force in either a lateral, longitudinal, or vertical direction. With respect to this loading, substantially coplanar is defined as a range +/−5 degrees of being coplanar. As shown in the cross-sectional view of FIG. 11, the rear end of the steering mount structure 32 may be attached to the front end 129 of structural member 24 which may extend rearward and downward from the steering mount structure 32 to a rear end 130 attached to the front of the electronics housing 34. The swingarm 18, which supports the rear wheel 20, may connect to the rear end 136 of the electronics housing 34. The battery housing 22 may be located beneath the structural member 24 and in front of the electronics housing 34. The battery housing 22 may connect directly to a bottom surface the structural member 24 and the front surface of the electronics housing 34. The steering mount structure 32 may be integrally joined to the structural members 24, 26 such that separating the steering mount structure 32 from the structural members 24, 26 may damage the components. For example, the steering mount structure 32 may be welded, brazed, or adhesively joined to the structural members 24, 26.

Figure 11:
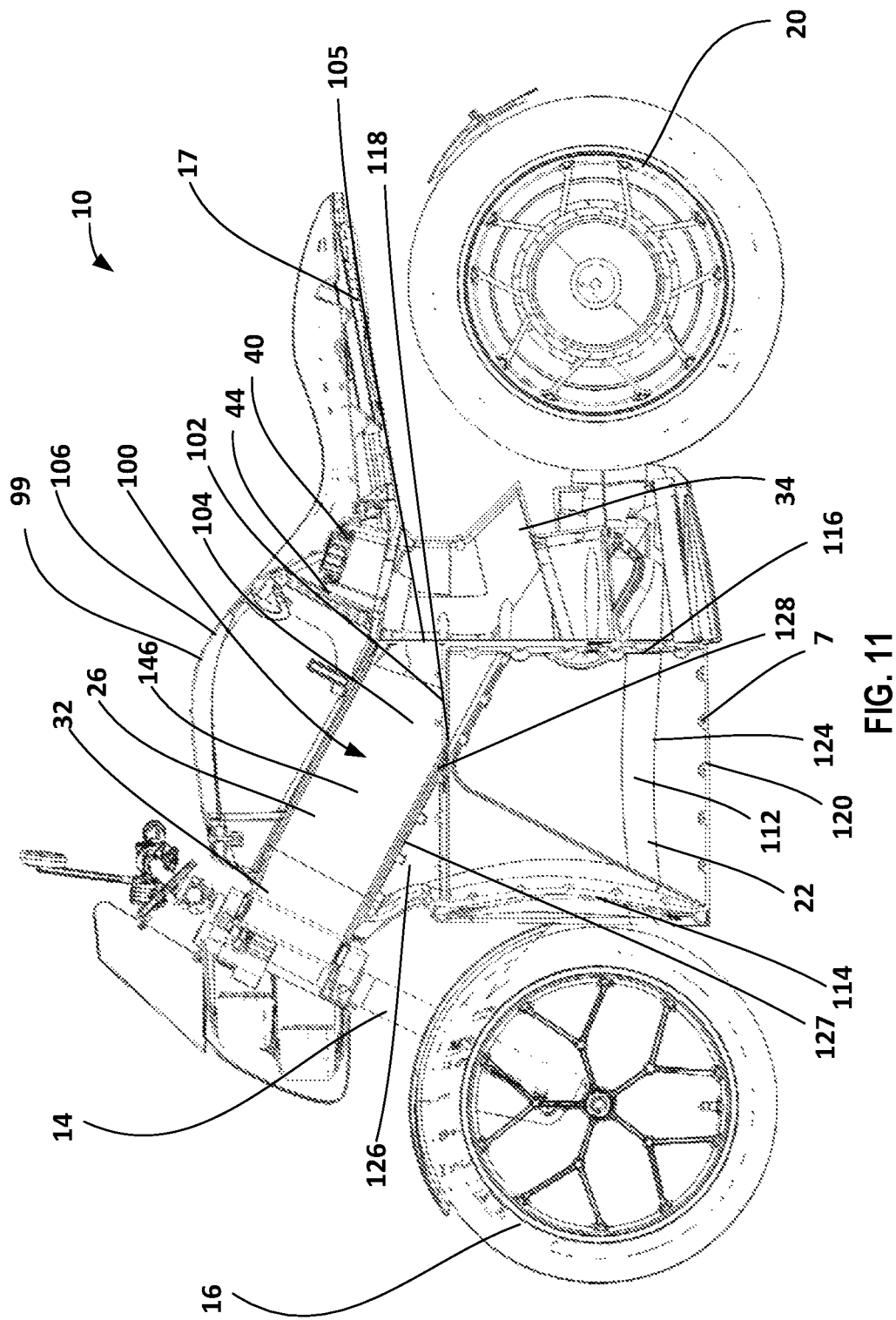
FIG. 11 illustrates a cross-sectional side view of the electric saddle type vehicle chassis of FIG. 10 according to aspects disclosed herein.

In addition, the storage compartment 100 may be seen in FIG. 11. The storage compartment 100 may have a bottom surface 102 formed by a top wall 118 of the battery housing 22, a first side surface 103 formed by inner surfaces 140 of the first structural member 24, a second side surface 104 formed by inner surfaces 146 of the second structural member 26, a rear surface 105 formed by a forward surface of the electronics housing, and a top surface 106 formed by the storage compartment cover 99. As another options, a portion of the first and second side surface 102 may be formed by inner surfaces 132 of the extensions 126.

The battery housing 22 may include a front wall 114, a rear wall 116 opposite the front wall 114, a top wall 118 extending rearward from the front wall 114, a bottom wall 120 extending rearward from the front wall 114 opposite the top wall 118, a first side wall 122 extending between the top wall 118 and the bottom wall 120, and a second side wall 124 extending between the top wall 118 and the bottom wall 120. The electronics housing 34 may be connected to the rear wall 116 of the battery housing 22. In addition, the battery housing 22 may have a pair of extensions 126 protruding vertically from the top wall 118, wherein a first extension 126A of the pair of extensions may engage and connect to the first structural member 24 and a second extension 126B of the pair of extensions 126 may engage and connect to the second structural member 26. The extensions 126 may have an angled top surface 127 and may extend from the top wall 118 at an intersection point 128 near a center of a rearward distance between the front wall 114 and the rear wall 116. Accordingly, the top surface 127 of the extension 126 may be spaced a greater distance away from the top wall 118 near the front of the battery housing 22 than at the intersection point 128. The extensions 126 may be arranged above the side walls 122, 124 such that the exposed outer side surfaces of the battery housing may be a smooth continuously contoured surface. The wall thickness of the extensions 126 may be similar or the same as the side wall thickness to provide an open space between the extensions 126 to help form the storage compartment 100 when attached to the structural members 24, 26. The top wall 118 and the top surfaces 127 of the pair of extensions 126 may directly connect to the structural members 24, 26.

Figure 12:
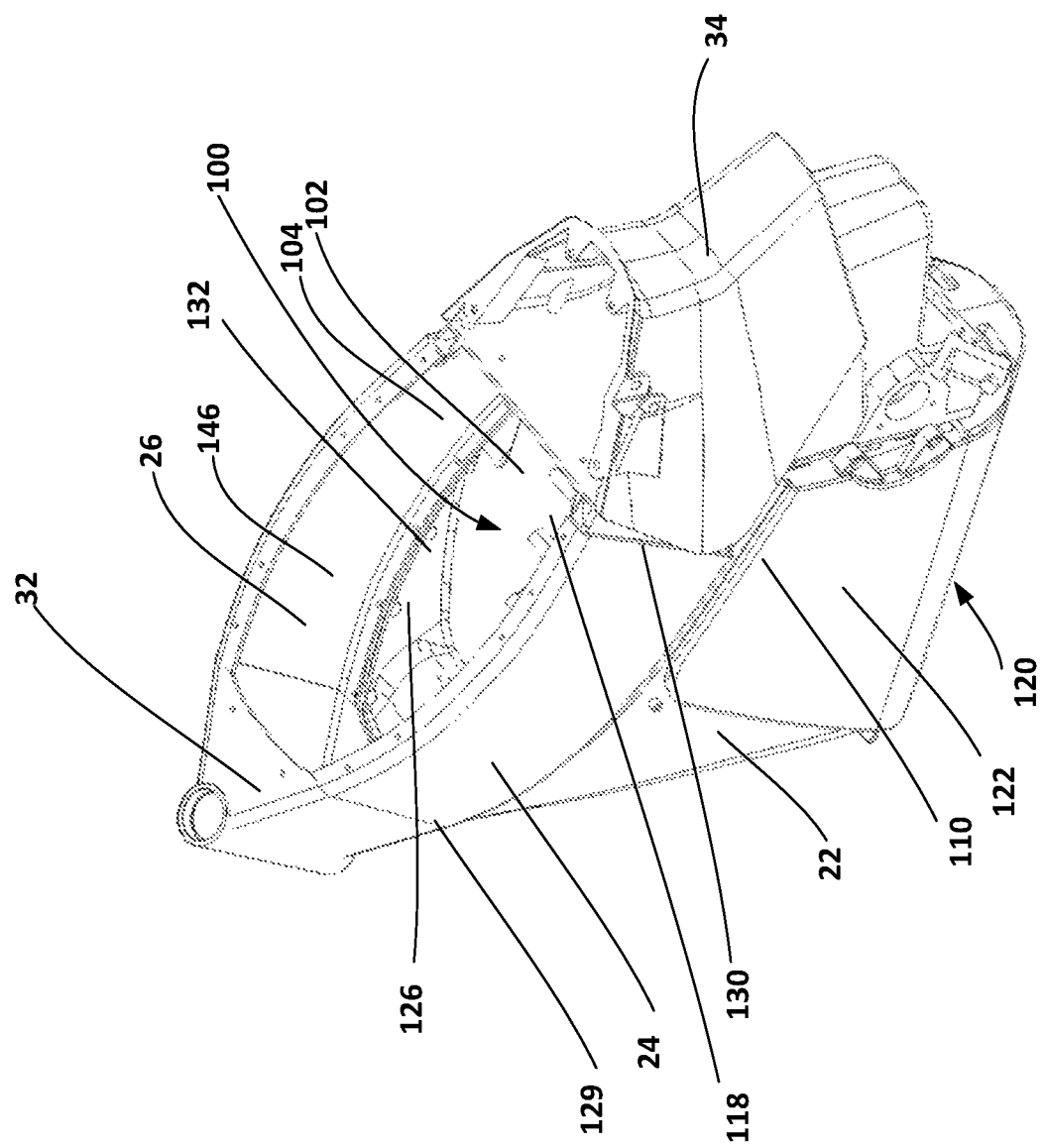
FIG. 12 illustrates an rear perspective view of the electric saddle type vehicle chassis of FIG. 6 with multiple part removed for clarity according to aspects disclosed herein.
Figure 14:
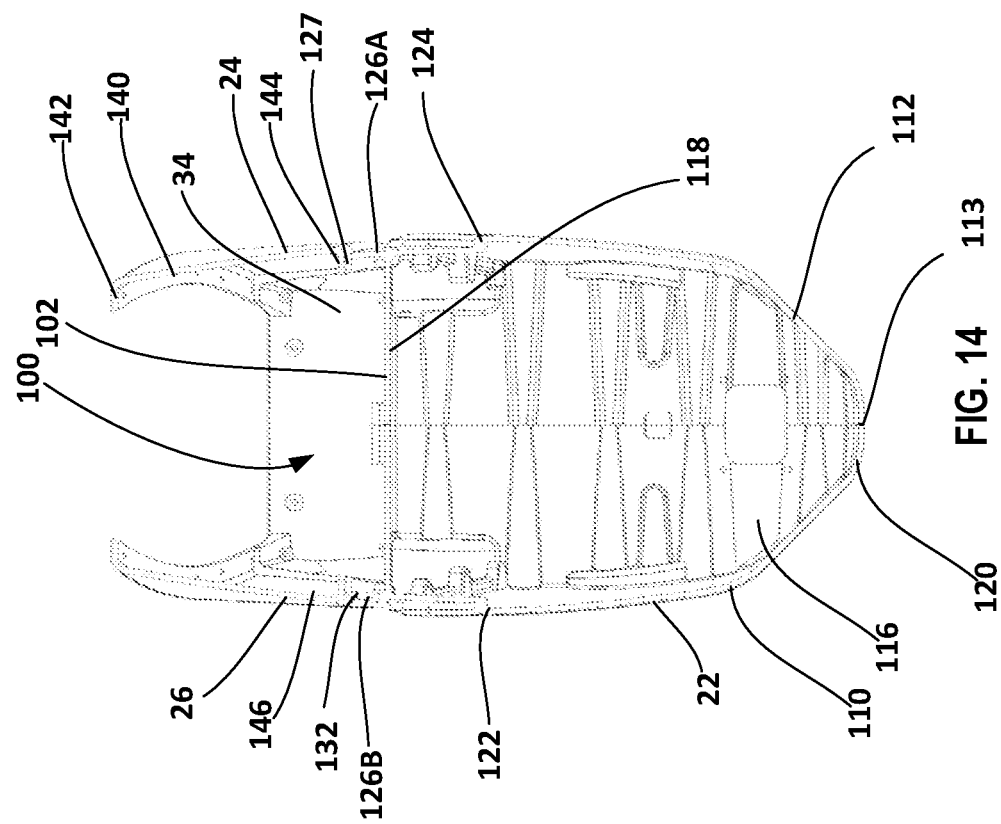
FIG. 14 illustrates a cross-sectional front view of the electric saddle type vehicle chassis components of FIG. 13 according to aspects disclosed herein.
Figure 13:
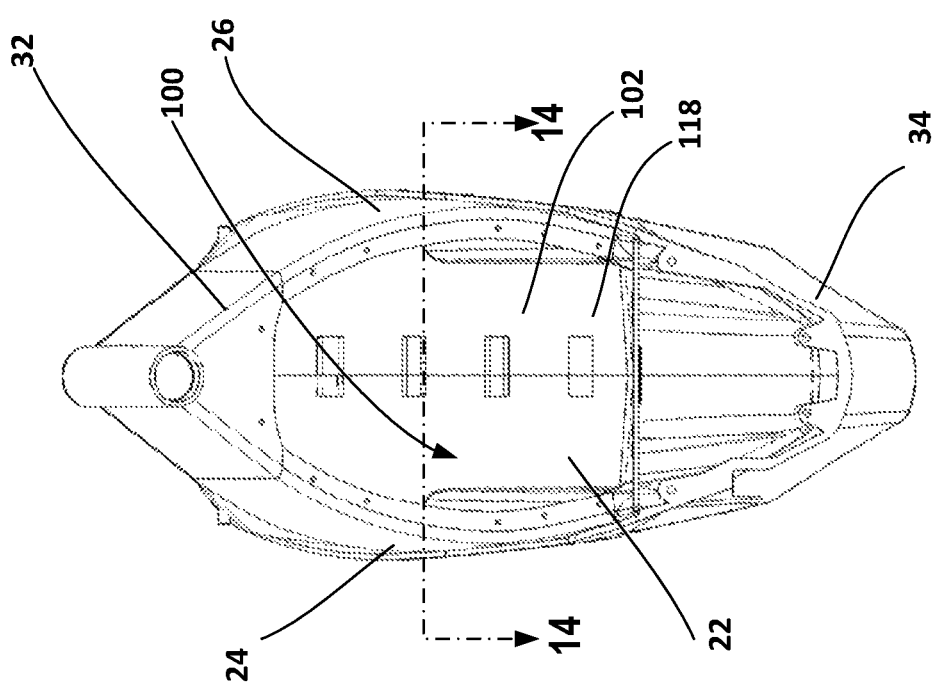
FIG. 13 illustrates a top view of the electric saddle type vehicle chassis components of FIG. 12 according to aspects disclosed herein.

FIGS. 12-14 illustrate the structure of the steering mount structure 32, the structural members 24, 26, the electronics housing 34, and the battery housing 22 in more detail. FIGS. 12-14 have all of the components removed except steering mount structure 32, the structural members 24, 26, the electronics housing 34, and the battery housing 22 to better illustrate this portion of the chassis 12. FIG. 12 shows the inside of the storage compartment 100 without the cover 99. In addition, FIG. 14 illustrates a cross-sectional view through the storage compartment 100 and battery housing 22. The inner side surfaces 103, 104 of the storage compartment 100 may be formed by extensions 126 and the inner surfaces 140, 146 of structural members 24, 26. Further, the structural members 24, 26 may have a substantially C-shaped cross-section that includes an upper flange 142 and lower flange 144. The lower flange 144 may provide a mounting surface to the top surface 127 of the extensions 126. In addition, the bottom surface 102 of the storage compartment may be formed by an upper surface of the top wall 118.

The battery housing 22 may be formed from first side member 110 and second side member 112 and may be connected to each other along a longitudinal centerline of the motorcycle 10. Each side member 110, 112 may be formed as a unitary piece and may be formed from a metallic material using a casting, machining, forging, metal injection molding or other process known to own skilled in the art. In addition, the electronics housing 34 may be formed a unitary piece to may be formed from a metallic material using a casting, machining, forging, metal injection molding or other process known to own skilled in the art. Each of the structural members 24, 26 of the chassis 12 may also be formed as a unitary piece and formed from a metallic material using a casting, machining, forging, metal injection molding, extrusion, or other process known to own skilled in the art. While not limiting, metallic materials may be aluminum or aluminum alloy, magnesium or magnesium based alloy, a steel alloy, or other metallic material known to one skilled in the art. In some embodiments, the side members 110, 112 may be formed from a nonmetallic material such as carbon composite structure, or fiber-filled polymeric material. Alternatively, in some embodiments, the structural members 24, 26, electronics housing 34, and side members 110, 112 of the battery housing 22 may be formed from multiple components. In some embodiments, the battery housing 22 may include an environmental seal 113 between the side members 110, 112 to help keep dust and moisture from entering the battery compartment. The seal may be formed from an elastomeric material.

While the invention has been described with respect to specific examples including presently preferred modes of carrying out the invention, those skilled in the art will appreciate that there are numerous variations and permutations of the above described systems and methods. Thus, the spirit and scope of the invention should be construed broadly as set forth in the appended claims.

What is claimed:

1. A motorcycle chassis comprising:
   a steering mount structure at a front end of the motorcycle chassis, wherein the steering mount structure is configured to attach to a front suspension;
   a first structural member connected to and extending from a rear end of the steering mount structure to a front end of an electronics housing;
   a second structural member connected to and extending from the rear end of the steering mount structure to the front end of the electronics housing, wherein the first structural member is on a first side of the motorcycle chassis and the second structural member is on a second side of the motorcycle chassis opposite the first side;
   a battery housing connected to and positioned below the first and second structural members, wherein the battery housing contains at least one electrical energy storage device; and
   a storage compartment formed above the battery housing and between the first structural member and the second structural member, wherein the storage compartment forms an enclosed volume, wherein the storage compartment includes a bottom surface formed by a top surface of the battery housing, a first side surface formed by an inner surface of the first structural member, a second side surface formed by an inner surface of the second structural member, a rear surface formed by a forward surface of the electronics housing, and a top surface formed by a storage compartment cover.

2. The motorcycle chassis of claim 1, wherein the enclosed volume of the storage compartment is within a range of 30 liters and 60 liters.

3. The motorcycle chassis of claim 1, wherein the battery housing comprises a first side member and a second side member opposite the first side member, wherein the first side member and the second side member when connected together form a hollow interior.

4. The motorcycle chassis of claim 1, wherein an exterior surface of the battery housing is exposed.

5. The motorcycle chassis of claim 1, wherein the electronics housing contains electrical components.

6. The motorcycle chassis of claim 1, wherein the electronics housing includes a charging port, wherein the charging port is accessed by opening a bodywork door, by opening the storage compartment cover, or by lifting a seat or a portion thereof.

7. The motorcycle chassis of claim 1, wherein the storage compartment is accessed by opening a storage compartment cover positioned in front of a seat.

8. The motorcycle chassis of claim 1, wherein the battery housing further contains a battery management system, a DC/DC converter, and a charging member.

9. The motorcycle chassis of claim 1, wherein the storage compartment has a fitted liner inserted between the first structural member and the second structural member.

10. The motorcycle chassis of claim 1, wherein the first structural member and the second structural member are beams with a C-shaped cross-section.

11. The motorcycle chassis of claim 1, wherein the first structural member and the second structural member are formed from tubes welded together.

12. The motorcycle chassis of claim 1, further comprising a swingarm connected to the electronics housing, wherein the swingarm extends rearward of the electronics housing and is configured to support a rear wheel, and wherein the electronics housing is connected to a rear surface of the battery housing.

13. The motorcycle chassis of claim 1, wherein the battery housing includes an environmental seal.

14. The motorcycle chassis of claim 1, wherein a top surface of the battery housing has a pair of extensions protruding vertically from the top surface, wherein a first extension of the pair of extensions engages and connects to the first structural member and a second extension of the pair of extensions engages and connects to the second structural member.

15. A saddle vehicle chassis comprising:
   a steering mount structure at a front end, wherein the steering mount structure is configured to attach to a front suspension;
   a first structural member connected to and extending from a rear end of the steering mount structure to a front end of an electronics housing;
   a second structural member connected to and extending from the rear end of the steering mount structure to the front end of the electronics housing, wherein the first structural member is on a first side of the saddle vehicle chassis and the second structural member is on a second side of the saddle vehicle chassis opposite the first side;
   a battery housing connected to and positioned below the first and second structural members, wherein the battery housing is configured to contain at least one electrical energy storage device, wherein the battery housing includes a front wall, a rear wall opposite the front wall, a top wall extending rearward from the front wall, a bottom wall extending rearward from the front wall opposite the top wall, a first side wall extending between the top wall and the bottom wall, and a second side wall extending between the top wall and the bottom wall opposite the first side wall; wherein the electronics housing is connected to the rear wall of the battery housing;

a swingarm connected to the electronics housing, wherein the swingarm extends rearward of the electronics housing and is configured to support a rear wheel; and a storage compartment formed above the battery housing and between the first structural member and the second structural member, wherein the storage compartment forms an enclosed volume, and wherein the storage compartment includes a bottom surface comprising a top surface of the battery housing, a first side surface formed by an inner surface of the first structural member, a second side surface formed by an inner surface of the second structural member, a rear surface formed by a forward surface of the electronics housing, and a top surface formed by a storage compartment cover.

16. The saddle vehicle chassis of claim 15, wherein each of the first structural member and the second structural member have a substantially C-shaped cross-section.

17. The saddle vehicle chassis of claim 15, wherein the top wall of the battery housing has a pair of extensions protruding vertically above the top wall, wherein a first extension of the pair of extensions engages and connects to the first structural member and a second extension of the pair of extensions engages and connects to the second structural member.

18. The saddle vehicle chassis of claim 15, wherein the enclosed volume of the storage compartment is within a range of 30 liters and 60 liters.

19. The saddle vehicle chassis of claim 15, further comprising a seat support structure connected to the electronics housing.

20. A structural frame for a saddle vehicle comprising:

a steering mount structure at a front end of the structural frame, wherein the steering mount structure is configured to attach to a front suspension;

a first structural member connected to and extending from a rear end of the steering mount structure to a front end of an electronics housing;

a second structural member connected to and extending from the rear end of the steering mount structure to the front end of the electronics housing, wherein the first structural member is on a left side of the structural frame and the second structural member is on a right side of the structural frame;

a battery housing connected to and positioned below the first and second structural members, wherein the battery housing is configured to contain at least one electrical energy storage device, wherein the battery housing includes a front wall, a rear wall opposite the front wall, a top wall extending rearward from the front wall, a bottom wall extending rearward from the front wall opposite the top wall, a left side wall extending between the top wall and the bottom wall, and a right side wall extending between the top wall and the bottom wall opposite the left side wall; wherein the electronics housing is connected to the rear wall of the battery housing; and wherein the front wall, the left side wall, and the right side wall have exposed portions; and a storage compartment formed above the battery housing and between the first structural member and the second structural member, wherein the storage compartment forms an enclosed volume, wherein the storage compartment includes a bottom surface formed by a top surface of the battery housing, a first side surface formed by an inner surface of the first structural member, a second side surface formed by an inner surface of the second structural member, a rear surface formed by a forward surface of the electronics housing, and a top surface formed by a storage compartment cover.

21. The structural frame for a saddle vehicle chassis of claim 20, further comprising a swingarm connected to the electronics housing, wherein the swingarm extends rearward of the electronics housing and is configured to support a rear wheel.

* * * * *